United States Patent [19]
Hall

[11] Patent Number: 4,645,146
[45] Date of Patent: Feb. 24, 1987

[54] WINDOW PANEL

[75] Inventor: Christopher W. G. Hall, Redditch, England

[73] Assignee: Pilkington Brothers P.L.C., St. Helens, England

[21] Appl. No.: 721,943

[22] Filed: Apr. 11, 1985

[30] Foreign Application Priority Data

Apr. 18, 1984 [GB] United Kingdom ............... 8410042
Apr. 18, 1984 [GB] United Kingdom ............... 8410043

[51] Int. Cl.⁴ .............................................. B64C 1/14
[52] U.S. Cl. .................................. 244/129.3; 156/155; 156/273.9; 156/304.6; 219/203; 296/84 R
[58] Field of Search ............................. 244/129.3, 121; 156/107, 155, 273.9, 304.6; 428/200; 219/203, 218; 296/84 R, 84 A; 52/98, 99, 172, 173 R, 202, 203

[56] References Cited

U.S. PATENT DOCUMENTS

| 2,464,826 | 3/1949 | Neher et al. | 244/129.3 |
| 3,542,619 | 11/1970 | McManus | 156/273.9 |
| 3,574,024 | 4/1971 | Rose | 156/273.9 |
| 4,184,000 | 1/1980 | Denman | 156/273.9 |

Primary Examiner—Sherman D. Basinger
Assistant Examiner—Rodney Corl
Attorney, Agent, or Firm—Burns, Doane, Swecker & Mathis

[57] ABSTRACT

A window panel for an unpressurized aircraft has an outer glass sheet and an inner sheet of plastics material. A peripheral adhesive band is adhered to the exposed face of the inner sheet and has an adhesive face of a thermoplastic material for adhesion to a window frame. An electrical heater is embedded in the peripheral band close to its adhesive face.

14 Claims, 3 Drawing Figures

WINDOW PANEL

TECHNICAL FIELD

This invention relates to a window panel, and in particular to a window panel for forming part of a glazing system for an unpressurised aircraft, in particular a helicopter windscreen.

BACKGROUND ART

Conventional helicopter windscreen panels are of a laminated structure comprising a glass outer sheet which is bonded by a polyvinylbutyral interlayer to an inner sheet of plastics material, usually a stretched acrylic sheet.

There is a requirement for rapid replacement of windscreen panels, in particular if they are damaged under combat conditions, and the invention is concerned with an improvement in the use of an easily softened thermoplastic material which can be used to adhere a window panel to a window frame when a window panel is being fitted, and can also be resoftened for rapid removal of a damaged window panel.

It has been proposed in GB No. 1 207 483 to use an attachment strip of thermoplastic adhesive around the inner edge of an automobile windscreen, which strip embodies an electrical resistance wire. When the wire is connected to an electrical supply it heats and the thermoplastic material of the attachment strip softens so that the glass windscreen can then be adhered to the vehicle body. The thermoplastic strip used is a butyl rubber strip which is opaque.

GB No. 1 210 288 proposes the use of a tacky strip of uncured Neoprene-based material in which there is a groove in which a resistance wire runs and which is filled with a polysulphide mastic material which is softer than the material of the strip and which protrudes from the groove. When current is passed to soften the strip the mastic substance enters into any irregularities in the flange to which the window panel is being adhered.

The main problem when attempting to use a technique of this kind in the glazing of an aircraft windscreen is that a considerable amount of the adhesive strip would remain adhered to the window frame when the strip is heated for removal of a damaged window panel. This would mean that the window frame would have to be scraped and cleaned before a new window panel could be fitted.

It is a main object of the invention to overcome this problem.

SUMMARY

According to the invention there is provided a window panel having a peripheral adhesive band which is adhered to the inner face of the panel and has an adhesive face of thermoplastic material for adhesion to a window frame, and an electrical heating element embedded in the adhesive band closer to the adhesive face of the adhesive band than to the panel.

The window panel, may comprise an outer glass sheet and an inner sheet of polycarbonate or stretched acrylic. The inner polycarbonate sheet may have an outer coating of self-healing polyurethane.

The face of the adhesive band adhered to the window panel may be of a thermoplastic polymeric material. Preferably the adhesive face of the adhesive band is composed of a thermoplastic polymeric material of lower softening temperature than the face of the band adhered to the window panel. The adhesive band may also include a strip of thermosetting polymeric material between the electrical heating element and the face of the band adhered to the window panel.

In a preferred embodiment the peripheral adhesive band comprises a spacer strip of thermosetting polyurethane to one face of which the heating element is adhered by a first strip of thermoplastic polyurethane, a second strip of thermoplastic polyurethane which bonds the other face of the spacer strip to the inner face of the window panel, and a third strip of thermoplastic polyurethane of lower softening temperature than said bonding strips which is bonded to the first bonding strip and to the heating element and which provides the adhesive face for adhesion to the window frame.

Preferably the heating element is flat and extends substantially parallel to the adhesive face. Usually the adhesive band is of a transparent material.

The invention also comprehends an aircraft window panel of the invention when adhered to a window frame of an aircraft.

Further the invention comprehends a helicopter windscreen comprising two window panels according to the invention adhered side-by-side to the front window frame structure of a helicopter.

BRIEF DESCRIPTION OF THE DRAWINGS

FIG. 1 illustrates two window panels indicated generally at 1 and 2 which are adhered side-by-side to an upright member, indicated generally at 3, of the front window frame structure of the airframe of an unpressurised aircraft, such as a helicopter. The airframe includes such frame structure extending right around the windscreen area. Each of the window panels may be a flat panel or a curved wrap-around panel appropriate to the design of the aircraft.

Figure 1:
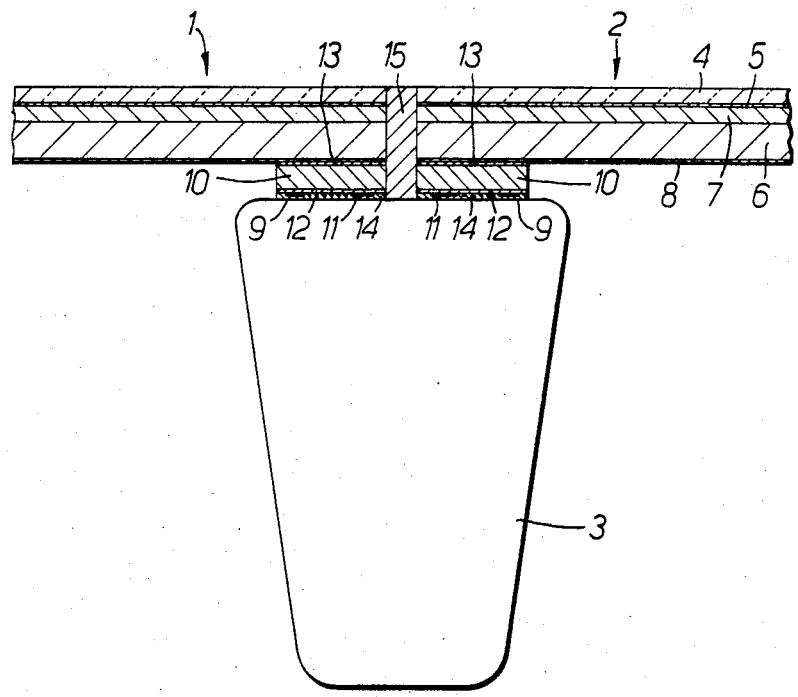
FIG. 1 is a sectional view through the edges of two laminated window panels according to the invention adhered side-by-side to the front window frame structure of a helicopter.

Each of the window panels comprises a laminate consisting of an outer glass sheet 4 which in this example is 2.5 mm thick and carries on its inner surface an electrically resistive heating film 5 of conventional kind.

The glass sheet of the laminate is bonded to an inner sheet 6 of polycarbonate which is 6 mm thick, by a polyurethane interlayer 7 which is 2.5 mm thick. The inner polycarbonate sheet 6 has an outer coating 8 of self-healing polyurethane which acts as a scratch-resistant layer, and may be for example an abrasion-resistant polyurethane of the kind described in GB No. 2 011 836 A or GB No. 2 070 045 A.

Around the periphery of the coated inner face of the polycarbonate sheet 6 there is a peripheral adhesive band which is adhered to the polyurethane coated face 8 of the polycarbonate sheet 6 and has an adhesive face 9 for adhesion to the window frame 3.

The peripheral adhesive band is transparent and comprises a spacer strip 10 of thermosetting polyurethane which is 4 mm thick, to one face of which a flat electrical heating element 11 is adhered by a first bonding strip 12 of thermoplastic polyurethane which is 0.5 mm thick. A second bonding strip 13 which is 0.5 mm thick of the same thermoplastic polyurethane as the strip 12 bonds the other face of the spacer strip 10 to the polyurethane coating 8 on the inner polycarbonate sheet 6 of the window panel. A third strip 14, which is 1 mm thick, of a thermoplastic polyurethane of lower softening temperature than the polyurethane of the bonding strips 12 and 13, is bonded to the first bonding strip 12 and to the heater element 11 which is, in effect, embedded in the polyurethane of this third strip 14 which provides the adhesive face 9 for adhesion to the window frame.

The bonding strips 12 and 13 may be of thermoplastic PN 03 polyurethane (a thermoplastic polyurethane available from K. J. Quinn & Company, Inc., of Malden, Mass., United States of America).

Figure 2:
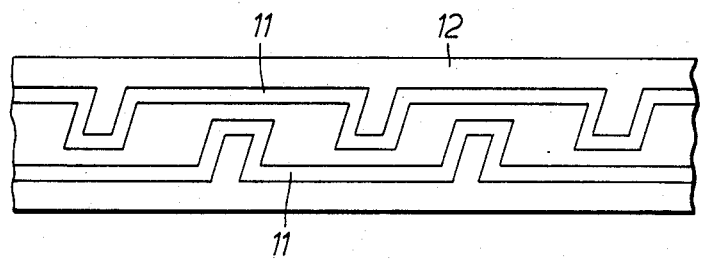
FIG. 2 is a diagrammatic view of an electrical heating element embedded in an adhesive band employed in the structure of FIG. 1.

During manufacture of the peripheral adhesive band the electrical heating element 11 is laid down on the outer face of the strip 12 in the form of two copper strips of crenellated configuration as illustrated in FIG. 2. The outer strip 14 in which the heating element 11 is embedded is of thermoplastic polyether- or polyester-based polyurethane which is of a material which has a softening temperature of 70° C. to 120° C., that is below the softening temperature of the material of the bonding strips 12 and 13, and is sufficiently soft at about 105° C. for adhesion to, and release from, the airframe member 3.

The electrical heating element 11 is thus located asymmetrically in the peripheral adhesive band closer to the exposed adhesive face 9 of the adhesive band than it is to the polycarbonate sheet 6 of the window panel.

The adhesive band extends right around the inner periphery of the window panel. At an appropriate location ends of the heating element strips 11 are connected to terminals by which heating current can be applied.

The airframe window structure, one element of which is indicated at 3, may be of a fibre-reinforced material to which the polyurethane of the strip 14 readily adheres when that strip 14 is softened by the application of heating current to the heating strips 11.

A temporary protective layer may be applied on the adhesive face 9 of the strip 14 to avoid contamination during storage and handling. That protective layer would be removed before use.

As illustrated in FIG. 1, in an actual helicopter windscreen two such panels are mounted side-by-side with their edges separated by a gap of for example 4 mm which is filled with a silicone filler 15 to give a flush-mounted windscreen.

The peripheral adhesive band is transparent so that, in use, the extent of the wetting of the strip 14 onto the airframe window structure may be observed through the window panel when the band is heated by the heating element.

It is advisable, when glazing a helicopter window, that the temperature of the inner face of the window panel should not rise substantially, despite the heat which is being applied by the electrical heating element 11 embedded in the adhesive band to soften the polyurethane strip 14 sufficiently to ensure that it bonds to the airframe structure.

This construction provides thermal insulation between the heating element 11 and the coated inner polycarbonate sheet 6, principally by the substantial thickness of the spacer strip 10 of thermosetting polyurethane. This ensures that the adhesive strip 14 is softened and the window panel is adhered to the window frame before there has been any substantial heating of the coating 8 or the inner face of the polycarbonate sheet 6.

The softening of the strip 14 during a glazing operation provides a cushioning effect which ensures uniform contact of the peripheral adhesive band with the window frame structure 3 when uniform positive pressure is applied to the outside of the window panel during fitting, and the bulk of the peripheral adhesive band remains sufficiently stiff to transmit the clamping force. This pressure is maintained on the window panel after the heating current has been switched off and until the strip 14 has stiffened and the adhesion of the window panel to the airframe is assured.

When a damaged panel has to be removed, heating current is switched to the heating element strips 11 and there is preferential softening of the strip 14. The damaged window panel can then be pushed out, taking the majority of the peripheral adhesive band with it, and a new panel can be applied without any major cleaning of the window frame being necessary. This ability to make and break adhesion to the airframe structure is not prejudicial to the bonding to each other of the elements which make up the adhesive band, or to the bonding of the adhesive band to the inner face of the window laminate, or to the constitution of the laminate itself.

The flush fitting of the window panels to the airframe structure gives a good field of view and the bonded construction has the ability to withstand airframe deflections and thermally-induced stresses which are peculiar to helicopter or light aircraft operation.

Figure 3:
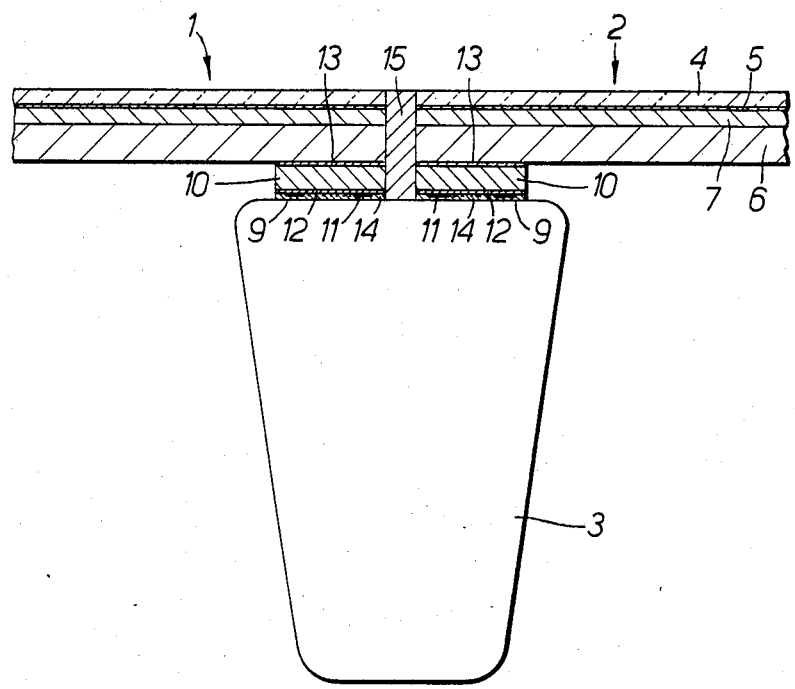
FIG. 3 is a view similar to FIG. 1 of laminated window panels of different construction.

Another construction according to the invention is illustrated in FIG. 3. The inner sheet 6 of the window panel is a sheet of stretched acrylic. Acrylic materials can become damaged when the temperature begins to rise somewhat above 100° C., because a sheet of stretched acrylic would undergo reversion at temperatures in excess of 104° C. In this embodiment, the strip 13 of the peripheral adhesive band is bonded directly to the exposed face of the inner acrylic sheet 6, and the thermal insulation provided by the strips 10, 12 and 13 of the peripheral band between the heater element 11 and the acrylic sheet 6 ensure that there is no substantial heating of the inner face of the acrylic sheet 6 during a glazing operation.

While only two specific embodiments of this invention have been illustrated and described, it is understood that various modifications and changes will become obvious to those skilled in the art. Such modifications and changes may be made without departing from the true spirit and scope of this invention.

I claim:

1. A window panel having a peripheral adhesive band which is adhered to the inner face of the panel and which adhesive band has an adhesive face of thermoplastic material for adhesion to a window frame, and electrical heating element means embedded in said adhesive band closer to said adhesive face of the adhesive band than to said inner face of the panel, said electrical heating element means being operable upon switching of heating current thereto, to preferentially heat said adhesive face of said adhesive band for making and breaking adhesion to said window frame without prejudice to the bonding of said adhesive band to said inner face of the panel.

2. A window panel according to claim 1, comprising an outer glass sheet and an inner polycarbonate sheet, with said adhesive band bonded to the inner face of said inner polycarbonate sheet.

3. A window panel according to claim 1, comprising an outer glass sheet and an inner stretched acrylic sheet, with said adhesive band bonded to the inner face of said stretched acrylic sheet.

4. A window panel according to any one of claims 1 to 3, wherein the face of the adhesive band adhered to said inner face of the window panel is of a thermoplastic polymeric material.

5. A window panel according to claim 1, wherein said adhesive band includes a strip of thermosetting polymeric material between said electrical heating element means and one face of said band which is adhered to said inner face of the window panel.

6. A window panel according to claim 1, wherein the adhesive band is of a transparent material.

7. A window panel according to claim 1, wherein said electrical heating element means is a flat heating element which extends substantially parallel to said adhesive face of said adhesive band.

8. A window panel having a peripheral adhesive band which is adhered to an inner face of the panel and has an adhesive face for adhesion to a window frame, which adhesive face is composed of a thermoplastic polymeric material of lower softening temperature than the face of the band adhered to the window panel, an electrical heating element being embedded in the adhesive band closer to the adhesive face than to the panel, and the adhesive band including a strip of thermosetting polymeric material between the electrical heating element and the face of the band adhered to the window panel.

9. A window panel according to claim 8, wherein the heating element is flat and extends substantially parallel to the adhesive face.

10. A window panel having a peripheral adhesive band which is adhered to the inner face of the panel, wherein the peripheral adhesive band comprises a spacer strip of thermosetting polyurethane to one face of which an electrical heating element is adhered by a first bonding strip of thermoplastic polyurethane, a second bonding strip of thermoplastic polyurethane which bonds the other face of the spacer strip to the inner face of the window panel, and a third strip of thermoplastic polyurethane of lower softening temperature than said bonding strips which is bonded to said first bonding strip and to the heating element and which provides an adhesive face for adhesion to the window frame.

11. A window panel according to claim 10, wherein the heating element is flat and extends substantially parallel to the adhesive face.

12. A window panel having a peripheral adhesive band one face of which is adhered to the inner face of the panel, said adhesive band comprising:

an adhesive face for adhesion to a window frame, which adhesive face is composed of a thermoplastic polymeric material of lower softening temperature than said one face of the band; and an electrical heating element embedded in said adhesive band closer to said adhesive face than to said one face of said adhesive band.

13. An aircraft window panel having a peripheral adhesive band which is adhered to the inner face of the panel, which adhesive band has an adhesive face of thermoplastic material which is for adhesion to a window frame of an aircraft, and electrical heating element means embedded in said adhesive band closer to said adhesive face than to said inner face of said panel, said electrical heating element means being operable, upon switching of heating current thereto, to soften said adhesive face of said adhesive band without prejudice to the bonding of said adhesive band to the inner face of the panel.

14. A helicopter windscreen assembly comprising two window panels adhered side-by-side to a front window frame structure of a helicopter, each said window panel having a peripheral adhesive band which is adhered to the inner face of the associated panel, which adhesive bands each have an adhesive face of thermoplastic material which is adhered to said window frame, and electrical heating element means embedded in each of the adhesive bands closer to said adhesive faces than to said inner faces of the associated panel, said electrical heating element means being operable, upon switching of heating current thereto, to soften said adhesive faces of said adhesive bands sufficiently to allow removal of said window panels from said window frames without prejudicial heating of said inner faces of said window panels.

* * * * *